United States Patent [19]
Zimmermann

[11] Patent Number: 5,972,062
[45] Date of Patent: Oct. 26, 1999

[54] DEVICE FOR SEPARATING LIQUID DROPLETS FROM A GASEOUS FLOW AND/ OR FOR MATERIAL AND HEAT EXCHANGE

[76] Inventor: Max Zimmermann, Kaiserstrasse 245, D-76133, Karlsruhe, Germany

[21] Appl. No.: 08/973,610

[22] PCT Filed: Apr. 13, 1996

[86] PCT No.: PCT/DE96/00654

§ 371 Date: Dec. 10, 1997

§ 102(e) Date: Dec. 10, 1997

[87] PCT Pub. No.: WO97/38780

PCT Pub. Date: Oct. 23, 1997

[51] Int. Cl.$^6$ .................................................. B01D 45/08
[52] U.S. Cl. ............................................. 55/440; 55/464
[58] Field of Search ............................ 55/440, 464, 462, 55/442

[56] References Cited

U.S. PATENT DOCUMENTS

| | | | |
|---|---|---|---|
| 1,926,924 | 9/1933 | Sylvan | 55/440 |
| 2,019,186 | 10/1935 | Kaiser | 55/440 |
| 2,252,242 | 8/1941 | Wood | 55/440 |
| 3,338,035 | 8/1967 | Dinkelacker | 55/440 |
| 3,504,484 | 4/1970 | Buffet | 55/440 |
| 3,813,855 | 6/1974 | Hill et al. | 55/440 |
| 4,072,478 | 2/1978 | Regehr et al. | 55/440 |
| 4,240,814 | 12/1980 | Regehr et al. | 55/440 |
| 4,361,426 | 11/1982 | Carter et al. | 55/440 |
| 4,543,108 | 9/1985 | Wurz | 55/440 |
| 4,581,051 | 4/1986 | Regehr et al. | 55/440 |
| 4,802,901 | 2/1989 | Wurz et al. | 55/440 |
| 4,975,101 | 12/1990 | Swanborn | 55/440 |
| 5,268,011 | 12/1993 | Wurz | 55/440 |
| 5,269,823 | 12/1993 | Wurz | 55/440 |

FOREIGN PATENT DOCUMENTS

| | | |
|---|---|---|
| 501146 | 9/1992 | European Pat. Off. ............... 55/440 |
| 2 395 061 | 1/1979 | France . |
| 2 537 887 | 6/1984 | France . |
| 34 06 425 A1 | 8/1985 | Germany . |
| 39 01 656 C2 | 8/1990 | Germany . |
| 42 14 094 C1 | 9/1993 | Germany . |
| 44 06 308 | 4/1995 | Germany . |
| 44 44 083 | 5/1996 | Germany . |

*Primary Examiner*—Duane S. Smith
*Attorney, Agent, or Firm*—Herbert Dubno

[57] ABSTRACT

A device for separating liquids from gases with a multiplicity of channels with inlets at an inlet plane, linear segments extending from the inlet plane to helical segments and linear outlet segments extending away from the helical segments. The channels are of uniform cross section across their entire length and in a plane perpendicular to the inlet plane for an undulating profile in projection and an undulating profile in projection in a plane perpendicular to both these latter planes and the inlet plane. The projections of the channel in these planes perpendicular to the inlet plane are offset in phase. The result is a true three-dimensional deflection of the fluid traversing each channel.

15 Claims, 4 Drawing Sheets

DEVICE FOR SEPARATING LIQUID DROPLETS FROM A GASEOUS FLOW AND/ OR FOR MATERIAL AND HEAT EXCHANGE

SPECIFICATION

CROSS REFERENCE TO RELATED APPLICATIONS

This application is a national phase of PCT/DE96/00654 filed Apr. 13, 1996.

FIELD OF THE INVENTION

The invention relates to a device for separating droplets from a gaseous stream and/or for heat and mass transfer. It consists of parallel flow channels that provide a deflection at least capable of inducing separation.

BACKGROUND OF THE INVENTION

Devices of this type that provide droplet separation already exist. The flow channels in this device demonstrate a more or less weak deflection in the inlet area followed by a stronger deflection in the mid section, capable of inducing separation. This is followed by an outlet section, in which a further deflection aligns the flow of the gaseous outlet from the separator parallel to the flow of the inlet gases.

Many types of separator use this basic concept, and each of them has its own emphasis. For example, the separator patented in DE 39 01 656 C2 has zigzag channel walls to improve the primary separation. In the same way, the separator patented in DE 34 06 425 A1 has a droplet acceleration section, which raises the inlet velocity of the two-phase mixture, thereby raising the centrifugal force in the deflection. The shape of the separator patented in DE 42 14 094 C1 is such that the angle of impact of separated droplets on the separator wall is as large as possible, thus lowering the separator's tendency to reflux. There are also separators with drainage grooves that divert the all film into special zones to increase the drainage capacity and re-entrainment velocity.

The above mentioned types of separator—hereafter referred to as conventional separators—have one characteristic in common, and this is that their flow channels only provide deflection in the x, z plane. These types of separator provide no flow deflection along the y axis. Another characteristic that these separators have in common is that the most effective deflection angle in their flow channels is around 90°+/−10°. With these types of separator designs, this angle represents a sensible compromise between good primary separation, which is known to increase with an increasing angle of deflection, and the drainage requirements of the flow channels. As the deflection angle increases and the walls of the flow channels become more perpendicular to the direction of the gravitational force, drainage becomes more difficult. This is because the sloping force, which is the drainage driving force, becomes increasingly weaker.

OBJECT OF THE INVENTION

It is an object of the invention to provide an improved separation device that is not subject to the above mentioned restrictions to the deflection angle.

SUMMARY OF THE INVENTION

This object is achieved by providing an arrangement of flow channels whose deflection occurs in three dimensions, and where all plane sections parallel to the inlet plane are identical if the wall thickness is ignored. Additionally, tangents drawn to the edges of the channel sections lying in this plane are parallel to one another at corresponding points. Helical flow channels exhibit these three-dimensional deflection characteristics, and are thus the form preferred by this invention. The deflection angles provided by this form are no longer subject to physical limits. The only limitation is the finite flow depth of the device. If the dimensions of the conventional droplet separators used to date are adhered to, this design provides a deflection angle of nearly 720°.

In order to sensibly orient the three-dimensionally curved flow channels adjacent to one another, this invention provides cross sections parallel to the inlet plane x, y of the device, which, if the wall thickness is ignored, are identical along the length of the separator. Another important characteristic of this invention is that these cross sections,—also referred to as horizontal sections—can be shifted with zero rotation to fit flush with one another. Tangents then drawn to the edges of each channel with zero rotation to fit flush with one another. Tangents then drawn to the edges of each channel section in this plane are then parallel to each other at corresponding points along the z axis.

By avoiding any cavities between the adjacently oriented flow channels, whether this is achieved by selecting the appropriate cross section or by using an applicable material coating, each wall section separates two adjacent flow channels, as is the case with conventional separators. The inside and outside of such a wall section then contributes to the form of both channels. In contrast to conventional separators, however, the flow channels of this invention are oriented parallel to one another in two directions, which are not necessarily perpendicular to one another.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
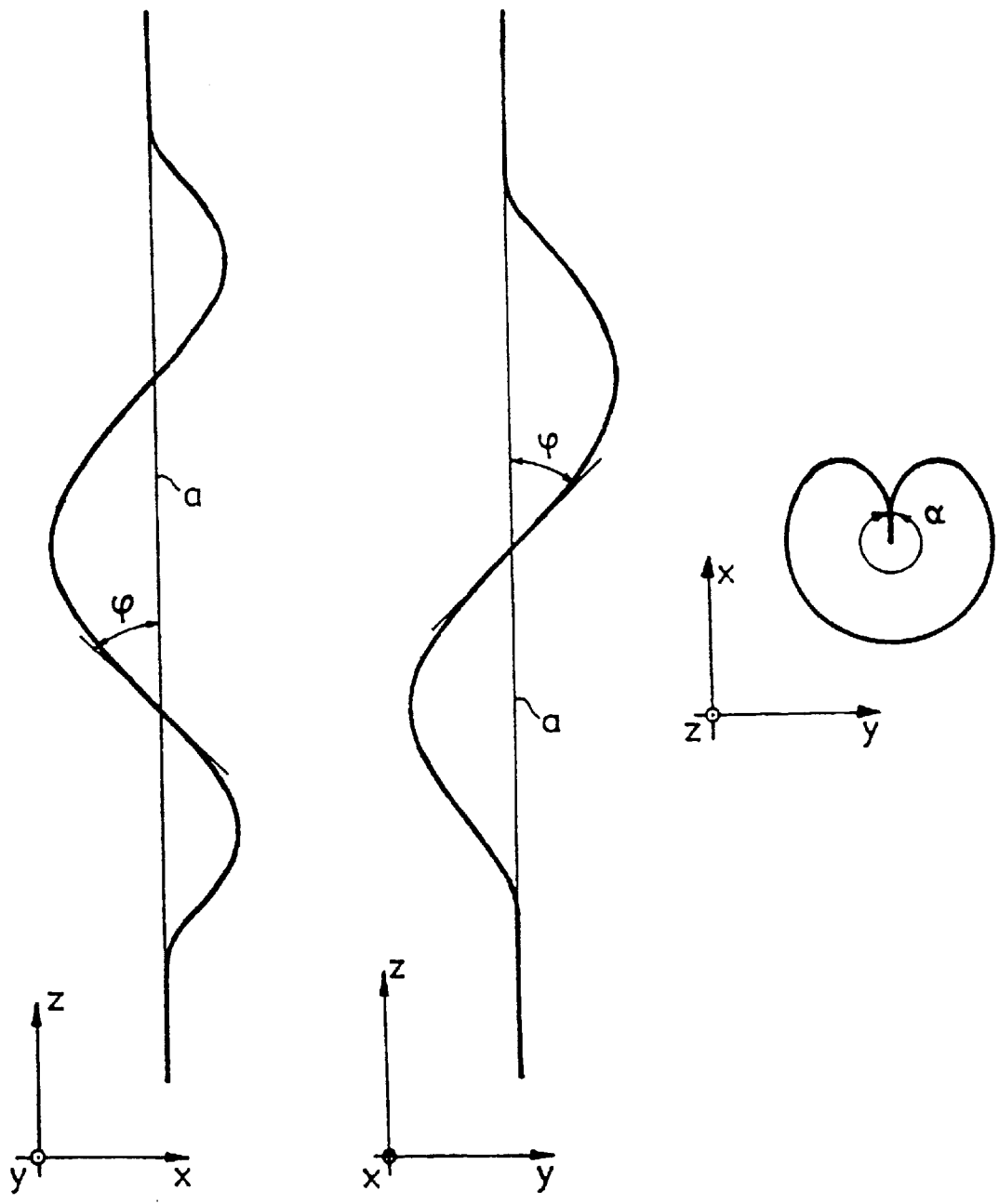
FIG. 1 is a diagram of projections of side, plane and end views of a flow channel of this invention, which has been reduced to a median line.

The version shown in FIG. 1 illustrates side and plan views of a flow channel in this invention that have been reduced to a median line. In addition to the coordinate axes, the deflection angle ($\alpha$) of the helix shaped channel section is shown projected onto its own axis. In this version the deflection angle is approximately 360°. The side views show the slope angle ($\phi$) of the helical deflection along with its axis (a). The slope angle in this version is a constant 45°, which results in a sine curve for the side views. The horizontal sections of the flow channel are identical in shape, which is one of the more important characteristics of this invention. In this example they lie in the x, y plane. The axis (a) of the helical channel section is perpendicular to this plane.

Figure 2A:
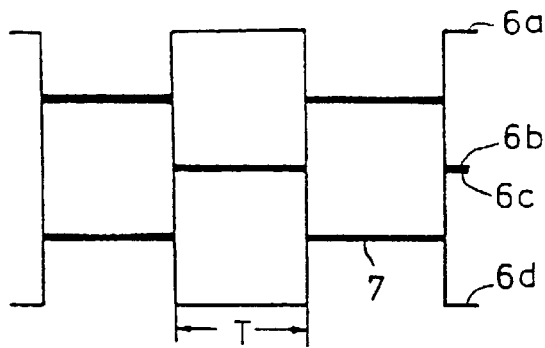
FIGS. 2a, 2b, 2c are diagrammatic cross sections of different versions of the flow channel inlets for this invention.
Figure 3:
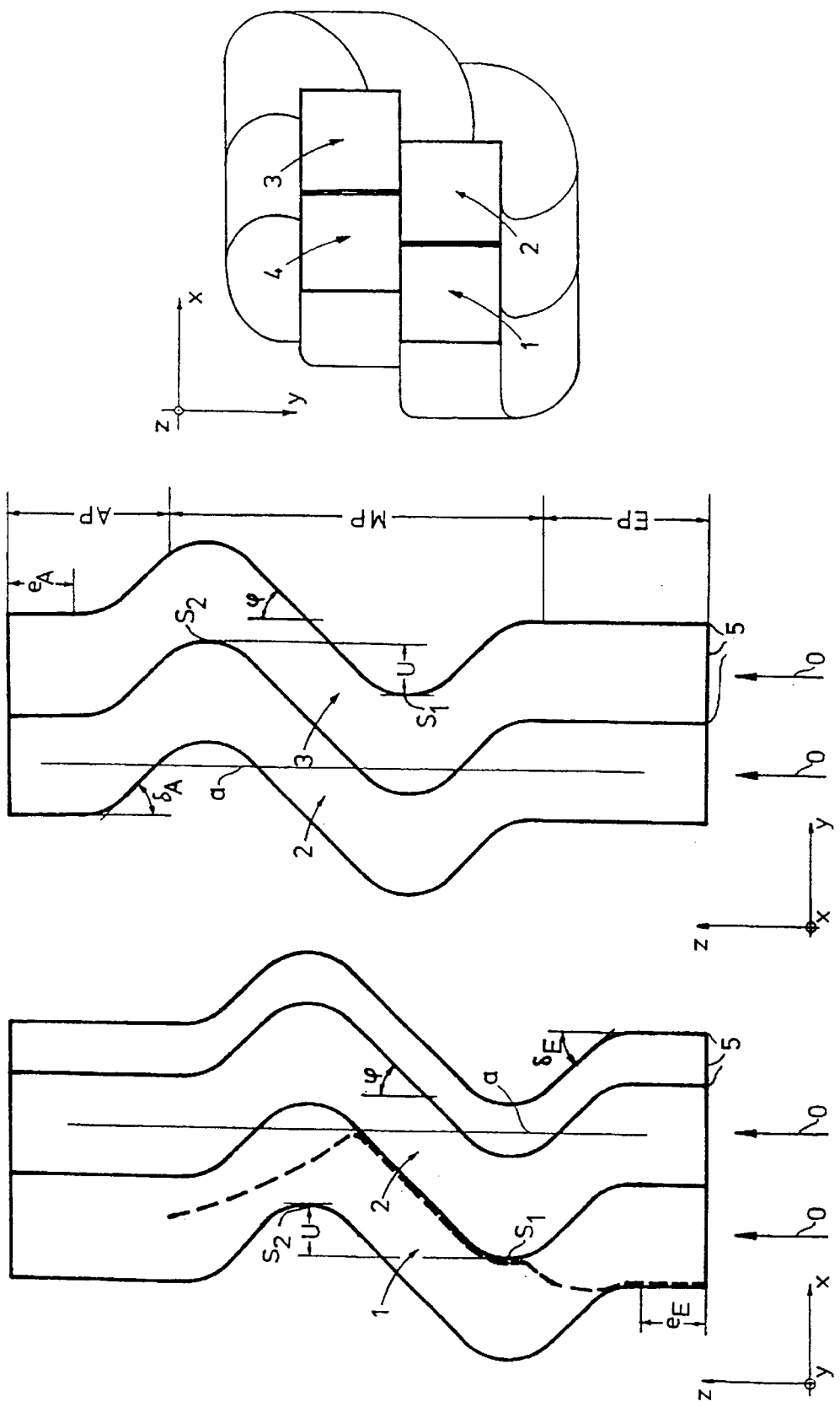
FIG. 3 is a diagram of projections of side, plan and end views of several adjacently mounted flow channels with square inlet cross sections.

FIG. 3 illustrates and explains how the device functions as a droplet separator. In this example, four identical flow channels (1, 2, 3 and 4) are shown in an arrangement that is the subject of this invention. This arrangement can naturally accommodate several more flow channels. The flow channels (1, 2, 3 and 4) have a square inlet cross section as shown in FIG. 2a. The deflection angle of this helical section is approx. 360°.

The inlet flow of droplet loaded gases is in the direction of the arrows (O). The fluids first the inlet section (EP) which consists of a section ($e_E$) with deflection ($\delta_E$) that is relatively straight and vertical to the inlet plane, and whose curvature is mostly in the x, y plane. A separation of the coarser droplets takes place in this first deflection.

The two-phase mixture then enters the helical section or midsection (MP) of the separator, where the arrangement of the flow channels is the subject of this invention. In this section, two factors combine to extract even the smallest droplets. The first factor is the large angle of deflection. The second factor is the angle of the air flow relative to the channel cross section, which constricts the air channel and increases the flow velocity. The helical channel walls cause the extracted droplets to impact at a relatively blunt angle, increasing the probability that they will be absorbed by the wall film on first contact with the wall. This arrangement, which is the subject of this invention, distinguishes itself through its exceptionally low emission of so-called secondary droplets, which includes reflected droplets and droplets generated as a result of the interaction with the wall film.

The outlet section (AP) follows the mid section and has a deflection ($\delta_A$), and a relatively straight section ($e_A$). This section aligns the outlet flow of largely droplet-free gases from the devices parallel to the inlet flow. The partial gas streams discharged from the separator exhibit a rotation that depends on the magnitude of the deflection angle. Because the direction of rotation of these air streams is the same, and because they are parallel and adjacent to one another, mutual interaction and friction cancels these rotations out after a short distance. This leaves a parallel gas stream, free from rotation.

As with conventional separators, the fluid film composed of droplets extracted by the device flows under gravitational force down the flow channels until it reaches the edge of the inlet channels (5), where it drops back into the stream in the form of large droplets. This process only functions when the force of gravity exceeds the drag that the gas flow exerts on the wall film. At a certain face or inlet velocity these forces cancel out each other and film flooding occurs on the sloping channel walls. With even higher face velocities, the drag effect of the gas phase predominates and the wall film is re-entrained and carried by the gas stream in the form of large droplets or jets of fluid out of the device. In contrast to conventional separators, this invention provides better drainage conditions because the wall film is more perpendicular and can flow along the sheltered corners between adjacent flow channels, at least in certain areas. The gas phase exhibits a reduction in drag along the shaded paths shown in FIG. 3.

Figure 2B:
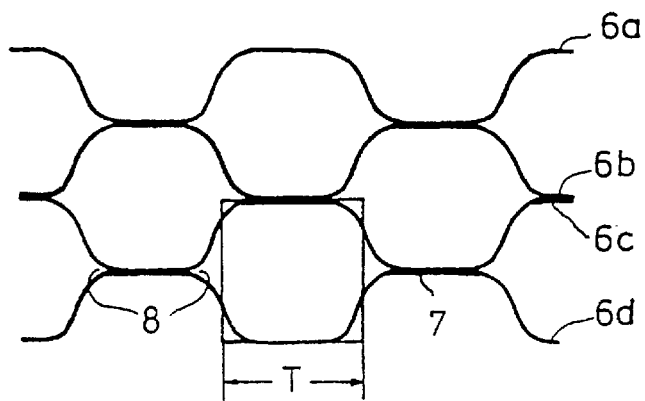
Figure 2C:
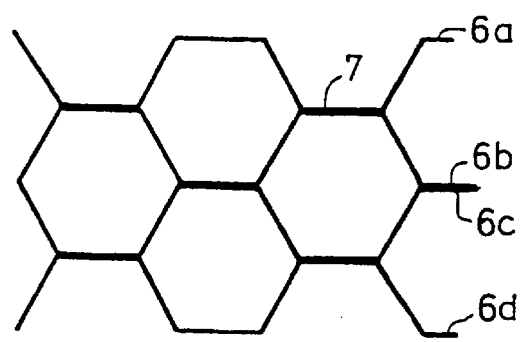

There is practically no limit to the choice of inlet cross section for the flow channels. However, for ease of production, and in order to avoid undesired cavities between the flow channels whose aggregation forms the device, circular or elliptical flow channels should be avoided. The versions shown in FIGS. 2, a, b and c, avoid cavities and offer the advantage, at least from the production perspective, that the device can be constructed from identically profiled layers (6a, b, c and d). To do this, the layers are arranged offset to one another and joined together at the touching walls (7), which are shown thickly drawn in FIGS. 2a, b, c and d. The profiles can be joined with resin, spot welded, or held together with overlapping sleeve extensions that fit over the inlet and outlet sections of the separator. The cross section shown in FIG. 2b has the advantage that the areas in close proximity to the joins offer a capillary duct (8) to the wall film for drainage, along which the film can flow protected from the gas stream. However, if the drainage fluid contains encrusting residues, there is a danger that they will gradually build up in this duct. In this case, the version shown in FIG. 2c is preferable. The corners of this honeycomb shaped cross section have an open angle of more than 90°, and have lost their capillary characteristics. The wall film, however, can still flow along these corners shielded from the gas stream.

The usual procedure for calculating the separation efficiency of separators (e.g. A. Bürkholz: Die Abscheidung von Nebeltropfen in Lammellenbündeln (The Separation of Mist Droplets in Laminated Bundles) Chem. Ing. Techn., MS 755/79) can also be applied to this invention. The calculation focuses on the most efficient deflection for separation, which is provided by the helical flow channels in this invention. The motion in this helical section can be considered to be circular with constant velocity, whereby the separation occurs solely as a result of the circular motion. Assuming that this model applies, the fractional separation efficiency $\eta$ of the invention can be calculated according to Bürkholz as:

$$\eta = \frac{\rho_{Tr} * d_{Tr}^2 * v_A * \tan\varphi}{18 * \mu_G * T} \qquad \text{Equation (1)}$$

and the limiting drop diameter as:

$$d_{Gr} = \sqrt{\frac{18 * \mu_L * T}{\rho_{Tr} * v_A * \tan\varphi * \alpha}} \qquad \text{Equation (2)}$$

where:

$\rho_{Tr}$=Viscosity of the fluid
$d_{Tr}$=Droplet diameter
$V_A$=Face velocity
$\alpha$=Deflection angle of the helical channel section
$\mu_{Gas}$=Dynamic viscosity of the gas
T=Pitch of the flow channels
$\phi$=Slope angle of the helical channel section
$d_{Gr}$=Limiting drop diameter
$\eta$=Fractional separation efficiency The pitch (T) is derived from the square root of the area of the flow channel's inlet section. The cross section of the flow channel's inlet in this invention is advantageously formed for droplet separators because it approximates a square section. As can be seen in FIG. 2b, the cross section approximates a square as near as possible. The radial wall separation of the flow channels, and therefore the "radial drop" of the droplets is practically constant within the helical section ($\alpha$). The pitch (T) of the flow channels is then equal to the length of the sides of such an equivalent square.

Equation (2) can be used to dimension the deflection angle of the helical section ($\alpha$) by specifying the limiting drop diameter, pitch, and face velocity.

The maximum permissible face velocity, that is the re-entrainment limit, of the invention depends on the slope angle of the helical channel section. Assuming that falling film behavior on a vertical wall applies, the maximum face velocity ($V_{A,max}$) for a flooding limit on the slope angle ($\phi$) of the walls of the helical section (relative to the direction of the gravitational force) can be calculated as:

$$V_{A,max} = V_{flood} * (\cos \phi)^{3/2}$$

From this equation, the following dimensioning specification for the maximum value of the slope angle ($\phi$) can be derived:

$$\phi_{max} = \arccos (V_{A,max}/k*V_{flood})^{2/3} \qquad \text{Equation (3)}$$

where:

$V_{A,max}$=maximum face velocity $V_{flood}$=flooding limit for the relevant gas/fluid mixture on a vertical wall k=0.7–0.95=safety factor, preferably 0.8–0.9.

The slope angle ($\phi$) of the helical section should be designed so that it has the maximum value derived from Equation (3) along its entire length. However, deviations from this value are feasible. For example, in order to reduce the pressure drop to a minimum, the slope angle can start with a small value at the inlet, and gradually increase to the maximum value specified by Equation (3) in the mid area of the helical section, and then gradually decrease until it reaches a minimum again at the outlet. In this case, the difference between the maximum and minimum values cannot exceed 30°.

The deflection angle of the inlet ($\delta_A$) and outlet ($\delta_E$) sections are identical to the respective slope angles of the inflow and outflow to the helical section. The lengths ($e_E$) and ($e_A$) of these inlet and outlet sections should lie within the limits $T/2 < e_E$, $e_A < 2*T/3$, and the offset (U) between the opposite vertexes ($S_1$, $S_2$) and between the vertex $S_1$ and the edge of the inflow (5) should lie with the limits T/8<U<T, preferably T/4–T/2.

For the separator that is the subject of this invention, a face velocity of vA=4 m/s and a pitch of T=20 mm results in a slope angle for the helical section of $\phi$=50° and a deflection angle of 540° for an air/water system. The limiting droplet diameter for this system is $$d_{Gr} = 12 \text{ }\mu m$$

and for a conventional droplet separator with a deflection angle of 90° and all other conditions being equal, $$d_{Gr} = 22 \text{ }\mu m$$

This quantitative example clearly demonstrates that the droplet separator that is the subject of the this invention can separate smaller droplets when functioning under equivalent conditions. In contrast to conventional separators, this improvement is separation efficiency is achieved with only a minimal drop in pressure. Further advantages are the high drainage capacity and the extreme rigidity of the structure, even with relatively thin walls. Its structure allows the side walls to be shaped as required, which allows the device to be adapted to fit any installation cross section.

The large angle of deflection and the simple structure that this invention has, gives it the positive characteristics of both a cyclone and a conventional separator.

A further advantage that this invention has, is that it is suitable for use as tower packing for heat and mass transfer. The task of a packed tower is to provide the fluids to be processed with an area of contact as large as possible. The invention increases the area of contact by splitting the fluid into partial flows and routing them through the helical section, which extends the paths that they travel.

The invention can be operated as a packed tower with both forward and reverse flows. It can be best applied to washing towers, where the gas is forced upwards and the fluid film trickles downwards under the force of gravity.

A large surface area and good fluid mixture are advantageous for an exchange. A good mixture of fluids occurs when the packed tower is used as a washing tower and operated within its flooding range. The upper limit of the flooding range coincides with the flooding limit, and represents the performance limits for the packed tower. Beyond this, the drag effect of the gas phase exceeds the force of gravity, with the result that the film can no longer flow downwards. With this invention, this limit depends not only on the density of the fluid, but also on the slope angle ($\phi$) of the helical section. The dimensioning specification for the slope angle ($\phi$) (from Equation (3)) also applies when designing the device for use as a packed tower, and guarantees that the device operates within the optimal flooding range when used as a packed tower.

The flow depth of a packed tower is usually many times that of a droplet separator, and for a packed tower the deflection angle ($\alpha$) is determined by the contact area that is required for the desired degree of heat/mass exchange.

If the deflection of the helical section is not constant, but occurs in 90° steps projected onto the x, y plane for example, these variants in deflection result in variations in the ratio of channel dimensions of effective channel cross section. This sudden increase in channel width is matched by an equivalent decrease in the perpendicular channel sides. Although this maintains an approximately constant cross section, the turbulence of the flow increases, which correspondingly increases the mass and heat exchange. This effect is accentuated when the inflow cross section of the flow channels approximates more to a rectangle than the square shown in FIG. 2b. The ratio of the lengths of the sides of the rectangle should lie within the preferred limits of 0.8–0.95. Regardless of whether this invention is used as a droplet separator or for heat and mass exchange, the wall separation in the helical section should not be so small that occlusions of fluids can occur.

Figure 4A:
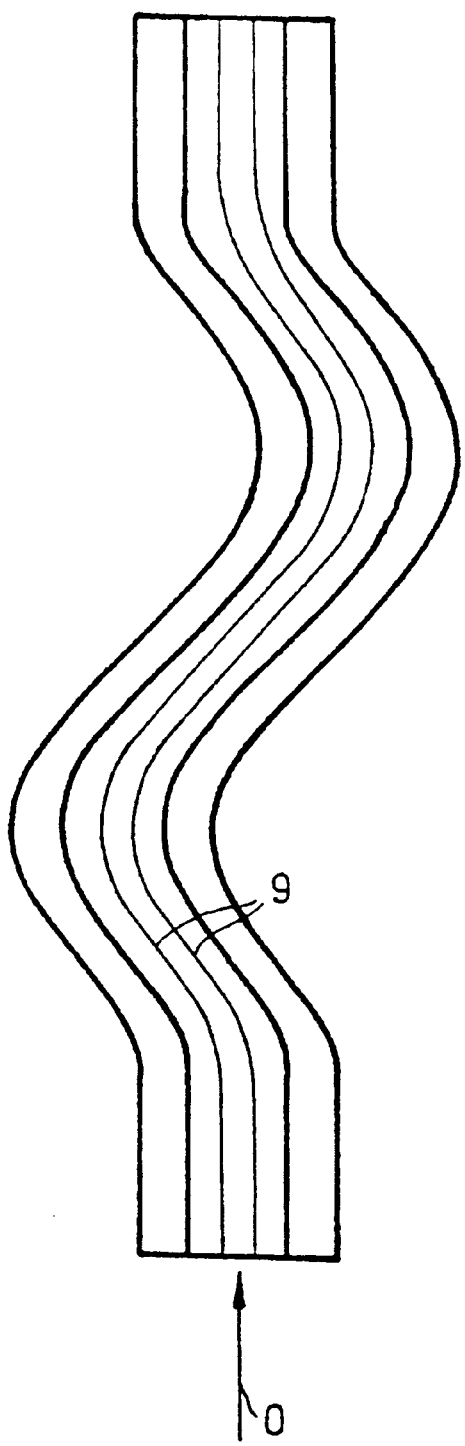
FIGS. 4a and 4b are center section through a flow channel with a honeycomb inlet cross section and film guides or grooves.
Figure 4B:
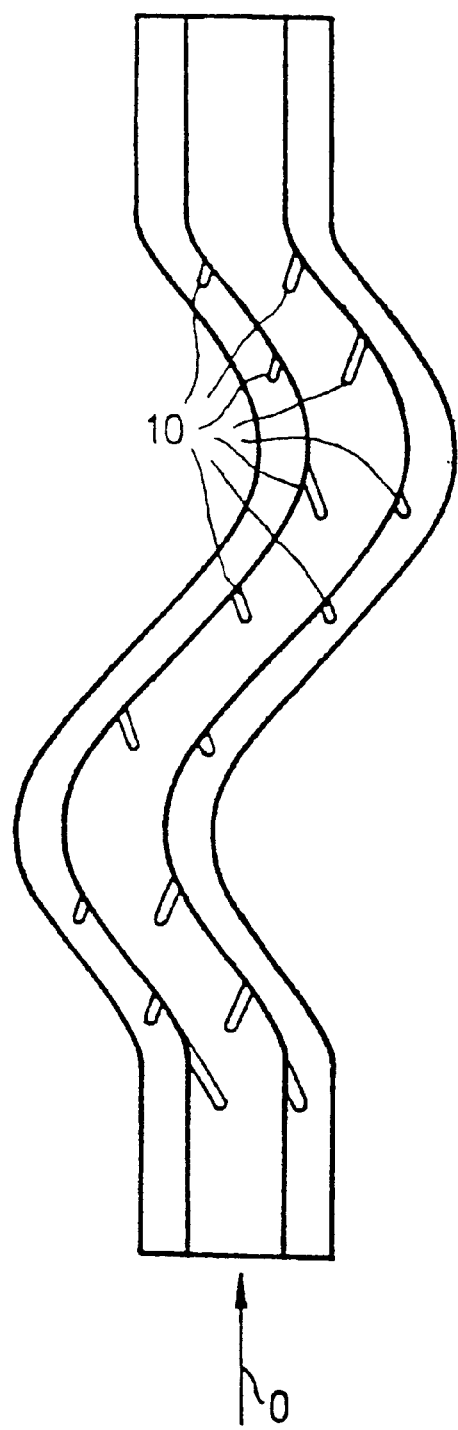

Furthermore, if an intensive exchange of mass and heat between fluid and gas phases is to be achieved, the fluid should be distributed as evenly as possible over the interior walls of the channels and should flow downwards. Capillary ducts (8) (as shown in FIG. 2b) or deeply etched drainage ducts should therefore not be used in the device if it is intended for use as a packed tower. However, weakly profiled film guides (9) in the form of slight corrugations in the channel walls running parallel to the channel corners as shown in FIG. 4a can prevent rivulets from forming in the corners of the flow channel. Grooves etched in the channels walls that start in the corners and point vertically downwards are suitable for conducting fluid that has accumulated in the corners of the flow channel back onto the walls, thereby increasing the contact with the gas flow. FIG. 4b shows an example version incorporating such etched grooves.

I claim:

1. A device for separating fluid droplets from a gaseous flow, said device comprising a plurality of flow channels running parallel to one another, and having inlet openings lying in an inlet plane, and, helical segments extending from said inlet openings, the channels each being capable of deflection of fluid flowing therethrough at least capable of inducing separation, the cross section of each channel in a first plane parallel to the inlet plane, ignoring thickness of the channel walls, being equal to the cross section of the other channels in said first plane and uniform along the length of the channel and tangents drawn to the edges of the cross sections lying in said first plane being parallel to one another at their corresponding points, profiles of the flow channels projected into a second plane perpendicular to said first plane having an undulatory course, profiles of the flow channels projected into a third plane perpendicular to both said first plane and said second plane having an undulatory course, and phases of said profiles of the flow channels projected into the second plane and the third plane being displaced to one another in order to achieve a three-dimensional deviation of the flow channels.

2. The device according to claim 1 wherein a slope angle (ϕ) of the helical section of the flow channels satisfies the dimensioning prescription $$\phi\text{max}=\arccos\,(V_{A,max}/k^{*}V_{flood})^{2/3}$$

where:

$V_{A,max}$ is the maximum admissible inlet velocity, $V_{flood}$ is the flooding limit for the relevant gas/liquid mixture at a vertical wall, k is a safety factor between 0.7 and 0.95.

3. The device according to claim 2 wherein a maximum of the slope angle (ϕ) of the helical section satisfies the dimensioning prescription and the difference between the largest and smallest values of the slope angle (ϕ) is a maximum of 30°.

4. The device according to claim 1 wherein inlet and outlet cross-sections of the flow channels are aligned with one another in a direction of flow through each channel.

5. The device according to claim 1 wherein the inlet cross-sections of the flow channels are rectangular.

6. The device according to claim 1 wherein the inlet cross-sections of the flow channels are honeycomb-shaped.

7. The device according to claim 1 wherein the outer edges of the inlet cross-sections of the flow channels are parallel and substantially straight at least at two opposite sides.

8. The device according to claim 7 which is composed of profiled layers with identical shape which are connected with one another at contacting parallel sides.

9. The device according to claim 8 wherein the inlet cross-sections of the flow channels have capillary ducts in the area of the joints of the profiled layers with identical shape.

10. The device according to claim 1 wherein said helical segments have deflection angles (α) satisfying the relation $$d_{Gr}=\sqrt{\frac{18*\mu_L*T}{\rho_{Tr}*V_A*\tan\varphi*\alpha}}$$

with the following meanings:

$\phi_{Tr}$=viscosity of the fluid $d_{Tr}$=droplet diameter $V_A$=face velocity α=deflection angle of the helical channel section $\mu_{Gas}$=dynamic viscosity of the gas T=pitch of the flow channels ϕ=slope angle of the helical channel section $d_{Gr}$=limiting drop diameter.

11. The device according to claim 10 wherein an offset exists between inlet edges and opposite vertexes and between opposite vertexes of the flow channels, said offset lying within the limits T/8<U<T.

12. The device according to claim 1 wherein inlet cross-sections of the flow channels are approximated by a non-square rectangle having an aspect ratio of 0.8–0.95.

13. The device according to claim 1 wherein the deflection of the helical segments of the flow channels has discrete steps.

14. The device according to claim 1 wherein the walls of the flow channels are provided with grooves conducting liquid aggregates out of the corners of the flow channels for obtaining an even liquid distribution.

15. A device for separating fluid droplets from a gaseous flow, said device comprising a plurality of flow channels running parallel to one another, and having inlet openings lying in an inlet plane, substantially straight segments extending from said inlet openings, helical segments connected to the straight segments and further straight segments connected to the helical segments, the channels each being capable of deflection of fluid flowing therethrough at least capable of inducing separation, the cross section of each channel in a first plane parallel to the inlet plane, ignoring thickness of the channel walls, being equal to the cross section of the other channels in said first plane and uniform along the length of the channel and tangents drawn to the edges of the cross sections lying in said first plane being parallel to one another at their corresponding points, profiles of the flow channels projected into a second plane perpendicular to said first plane having an undulatory course, profiles of the flow channels projected into a third plane perpendicular to both said first plane and said second plane having an undulatory course, and phases of said profiles of the flow channels projected into the second plane and the third plane being displaced to one another in order to achieve a three-dimensional deviation of the flow channels.

* * * * *